United States Patent [19]

Arnoldy

[11] 3,936,655

[45] Feb. 3, 1976

[54] MAGNETIC FEEDING OF POWDER IN SUBMERGED ARC WELDING

[76] Inventor: Roman F. Arnoldy, P.O. Box 19527, Houston, Tex. 77024

[22] Filed: Sept. 26, 1974

[21] Appl. No.: 509,427

[52] U.S. Cl. .................... 219/73; 219/76; 219/130; 219/137 WM
[51] Int. Cl.² .......................................... B23K 9/18
[58] Field of Search ................ 219/73, 76, 130, 137

[56] References Cited
UNITED STATES PATENTS

| | | | |
|---|---|---|---|
| 2,810,063 | 10/1957 | Brashear............................ | 219/73 X |
| 2,896,063 | 7/1959 | Jones.................................... | 219/73 |
| 3,060,307 | 10/1962 | Arnoldy.............................. | 219/130 |
| 3,172,991 | 3/1965 | Arnoldy.............................. | 219/130 |
| 3,260,834 | 7/1966 | Arnoldy.............................. | 219/73 |
| 3,358,115 | 12/1967 | Arnoldy.............................. | 219/73 |

Primary Examiner—J. V. Truhe
Assistant Examiner—David A. Tone
Attorney, Agent, or Firm—James F. Weiler; William A. Stout; Dudley R. Dobie, Jr.

[57] ABSTRACT

Bulkwelding is disclosed in which a consummable electrically conductive electrode is fed to a weld zone, and electric current is caused to flow in the electrode thereby providing a magnetic field about the electrode, particles of magnetically responsive weld material are fed to the electrode which magnetically adhere to it, fluxing materials are fed to the weld zone, preferably in front and in back of the electrode and adhered weld particles, and the electrode with the particles of weld material magnetically adhered to it are fed through the flux to the weld zone where the electrode and particles are melted to form the weld. The rate of feeding the weld particles and the electrode are coordinated to provide any desired ratio of weld particles to electrode in the weld. Both methods and apparatus are disclosed.

The apparatus includes a feeder having a discharge nozzle made of a non-conductive material which includes passage means for the electrically conductive consummable electrode, containers for holding the fluxing material and the magnetically-responsive weld particles, passage means from the weld particle container for feeding them to the electrode while in the nozzle, and passage means for feeding flux to the weld zone about, and preferably in front and in back of, the electrode with the weld particles magnetically adhered to it. Means are provided for coordinating and varying the rate of feeding the weld particles with respect to the electrode for varying the ratio of weld particles to electrode and thus the composition of the weld. A number of other features are disclosed.

11 Claims, 4 Drawing Figures

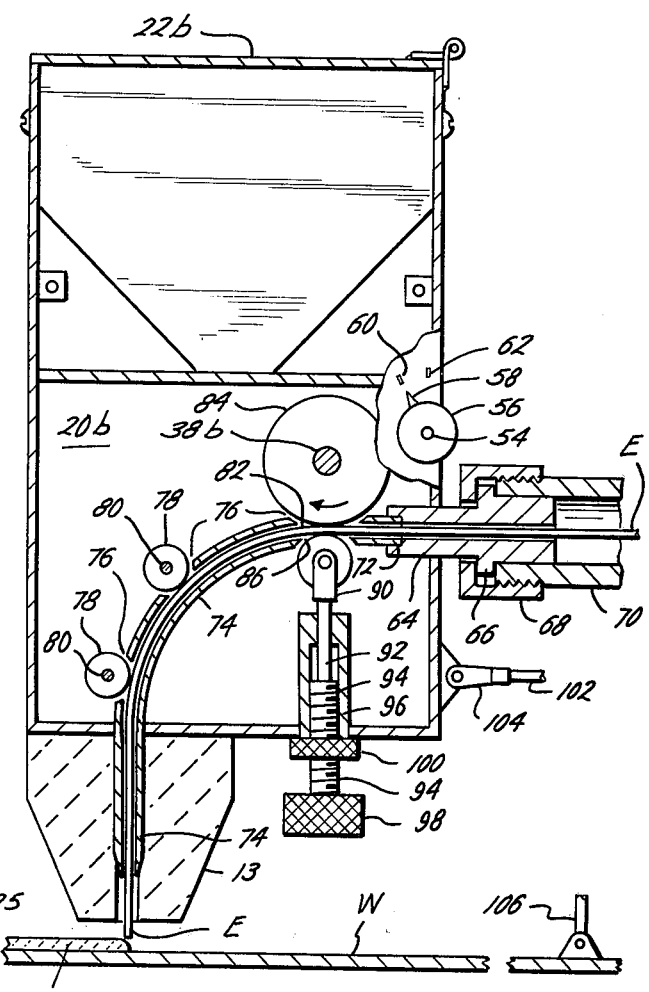
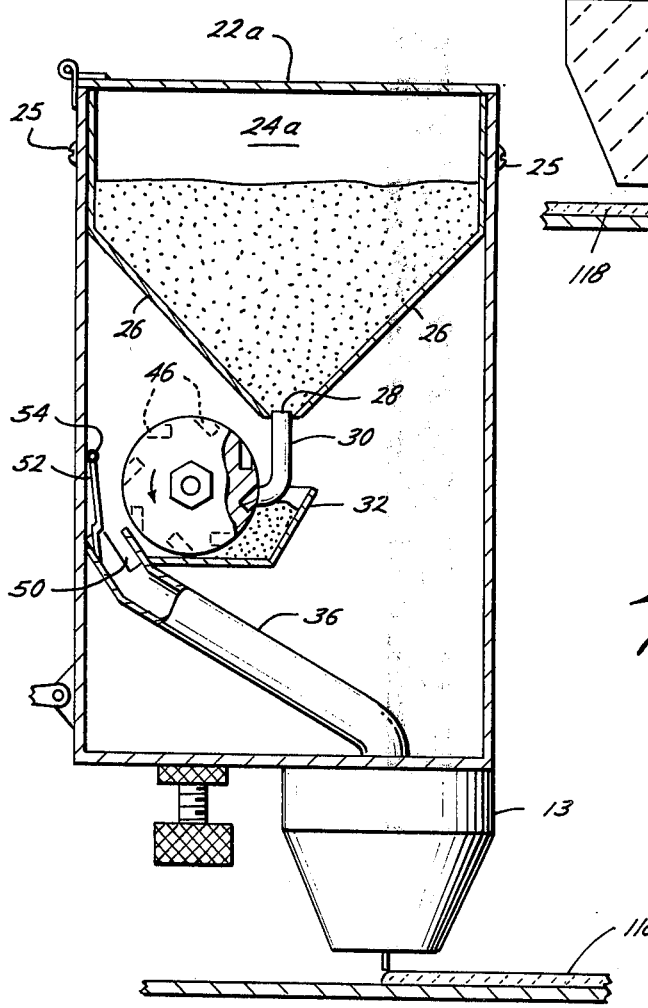

MAGNETIC FEEDING OF POWDER IN SUBMERGED ARC WELDING

BACKGROUND OF THE INVENTION

In prior submerged arc bulkwelding, for example as disclosed in my U.S. Pat. Nos. 3,076,888, 3,060,307, and 3,172,991, it has been necessary to feed the weld powder or particles into the weld zone on the work first, followed by the flux covering and the electrode. This requires sequential starts and stops in that in starting the powder feed must first be activated, then the travel started, then the flux feed activated and then the wire or electrode feed activated, and at the finish, the respective feeds and travel are deactivated in the reverse order. This results in inconvenience, and since the travel distance of the equipment because of the procedures is several inches longer, results in loss of time and materials and it requires skill in starting and stopping.

These difficulties are eliminated by the present invention wherein the electrically conductive, consummable electrode and flux are fed together as in an ordinary sub-arc operation but magnetically-responsive weld powder or particles are fed to the wire which magnetically adheres to it and are fed down through the flux into the weld zone. There is thus no need for sequential starts and stops and eliminates problems in connection therewith, and the whole welding operation operates from one start and stop switch.

The procedure of feeding materials into a weld zone by magnetic means is not new as fluxing material of some magnetic capacity has been fed in this manner. However, primary welding materials which are fully magnetically-responsive materials, such as iron powder, have not been fed in this way because the feeder nozzle jams and stops the flow of the powder or particles. The prior nozzles which are used were always metallic or had a metallic jacket. It was discovered that fluctuation in the current flowing in the electrode induced an electric current in the nozzle which set up a magnetic field around the nozzle which magnetically attracted the magnetically-responsive weld particles and caused this plugging and stoppage. The apparatus of the present invention by which methods of the present invention can be practiced includes a feeder having a nozzle which is formed of an electrically non-conducting material, such as a ceramic material, so that a magnetic field is not set up around and accordingly the nozzle does not magnetically attract the magnetically-responsive weld particles and clog, and the weld powder or particles magnetically adhere so tightly to the electrode that they are fed down through the flux into the weld zone, thus producing a viable and much more simplified welding procedure.

SUMMARY OF THE INVENTION

The present invention is directed to submerged arc bulkwelding in which an electrically conductive consummable electrode having magnetically-responsive particles of weld material magnetically adhered to it is fed down through flux into the weld zone thereby producing a viable and a simplified welding procedure avoiding sequential starting and stopping of the weld particle feed, travel of the weld feeder, flux feed activation and the wire or electrode feed activation.

It is therefore an object of the present invention to provide submerged arc bulkwelding in which a sequential starting of and stopping of feeding particles of weld material, travel, flux feeding and consummable electrode feed are eliminated along with their problems and the entire operation can start and stop simultaneously and from one start and stop switch.

A further object of the present invention is the provision of submerged arc bulkwelding in which an electrically conductive electrode is fed to a weld zone through which an electrical current flows thereby producing a magnetic field about the electrode, particles of magnetically-responsive weld material are fed to the electrode and thereby magnetically adhere to it, fluxing material is fed to the weld zone, and the electrode with the particles of such weld material magnetically adhere to it are fed to the weld zone through the fluxing material so that the particles of weld material are pulled down by the electrode through the flux into the weld zone where the consummable electrode and weld materials are melted to provide the bulkweld.

It is a further object of the present invention to provide such submerge arc bulkwelding in which the rate of feeding of the particles of magnetically-responsive material and electrode are coordinated and may be varied to provide metered varied amounts of them and thus a predetermined composition of the resulting weld or bulkweld.

A further object of the present invention is a provision of a method of submerged welding at a weld zone including causing an electrical current to flow in a consummable electrically conductive electrode thereby providing a magnetic field about the electrode, feeding particles of magnetically-responsive weld material to the electrode thereby magnetically adhering the particles of weld material to the electrode, feeding fluxing material to the weld zone, and feeding the electrode with the particles of weld materials magnetically adhered to it through the flux into the weld zone where the electrode and particles are melted to form a weld or bulkweld.

A further object of the present invention is the provision of such a process in which the rate of feeding the electrode and the weld particles is coordinated and may be varied to provide a bulkweld of predetermined composition of the particles and the electrode.

A further object of the present invention is the provision of a method of submerged arc bulkwelding in which an electrical current is caused to flow in a consummable electrically conductive electrode thereby providing a magnetic field about the electrode, particles of magnetically-responsive weld material are fed to the electrode and magnetically adhere to it, fluxing material is fed to the weld zone about the electrode, and the electrode with the particles of weld material magnetically adhered to it are fed through the flux to the weld zone thus pulling down the particles of weld material through the flux into the weld zone, submerged melting of the particles and electrode forming the bulkweld composition.

A further object of the present invention is a provision of a feeder for use in submerged arc welding in a weld zone which includes a discharge nozzle formed of non-conductive material, means for feeding an electrically conductive consummable electrode through the nozzle to the weld zone, means for feeding particles of magnetically-responsive weld material to the electrode within the nozzle, means for feeding fluxing material to the nozzle and about the electrode, and including means for causing an electric current to flow in the electrode thereby providing a magnetic field about the electrode so that the particles of magnetically-responsive weld material magnetically adhere to the electrode and are fed down through the fluxing material by the electrode as the electrode is fed to the weld zone.

A further object of the present invention is to provide such an apparatus which includes separate containers for the fluxing material and the particles of magnetically-responsive weld material with separate passageways from the containers into the nozzle for feeding the flux around the electrode and the weld particles to the electrode.

A further object of the present invention is a provision of such an apparatus for submerged arc bulkwelding which includes the containers and passageways as mentioned above and also includes means for adjustably coordinating the rate of feed of weld particles relative to the electrode so that the composition of the bulkweld formed of the melted particles and the electrode may be varied.

Other and further objects, features and advantages of the invention will appear from the Abstract of the Disclosure, the Background of the Invention, this Summary, the Brief Description of the Drawings, the Description of the Preferred Embodiments and the Claims.

BRIEF DESCRIPTION OF THE DRAWINGS

FIG. 3 is a sectional view, taken along the line 3—3 of FIG. 1, and FIG. 4 is a sectional view, taken along the line 4—4 of FIG. 1.

DESCRIPTION OF PREFERRED EMBODIMENTS

Figure 1:
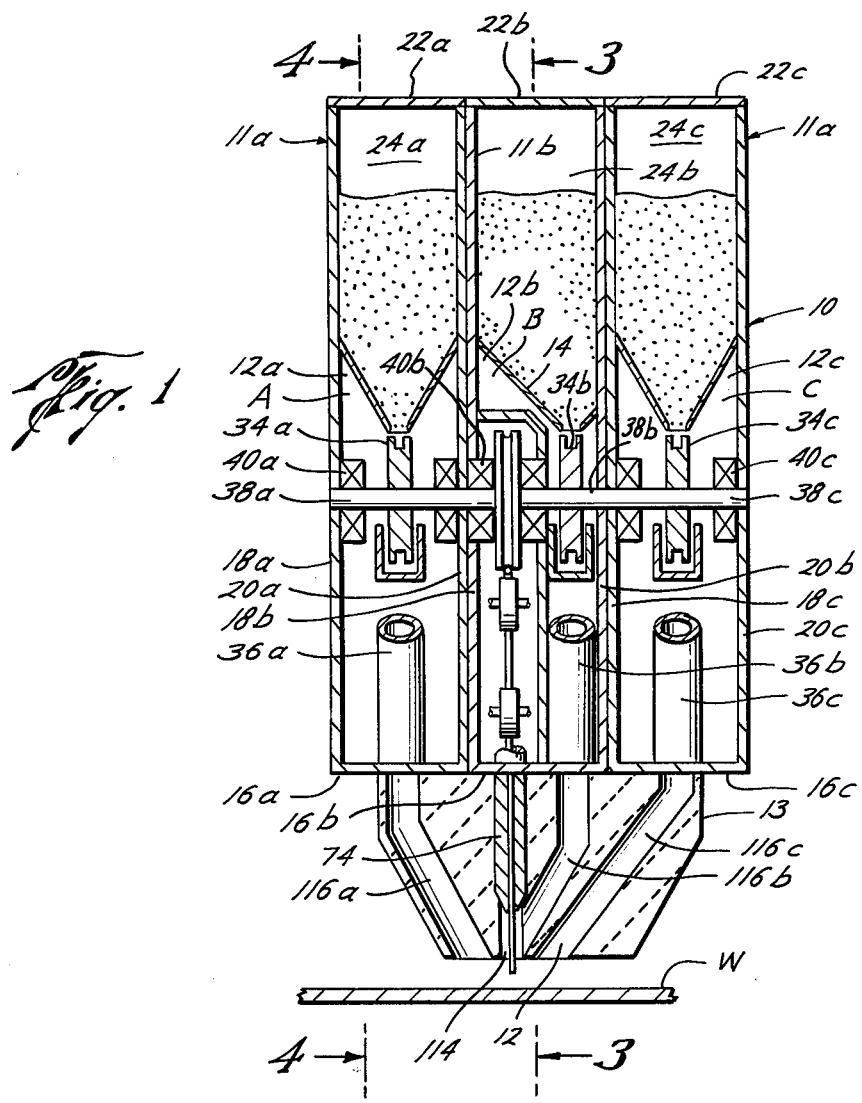
FIG. 1 is an elevational view, in section, illustrating an apparatus according to the invention and useful in the method of the invention.

The method of the invention involves feeding a consummable electrically conductive electrode to a weld zone either for providing a coating or cladding on a base metal or for welding members together. Particles of magnetically-responsive weld material are fed to the electrode which, when an electric current flows in the electrode, provides a magentic field about the electrode and magnetically adheres the weld particles to it. Fluxing materials are fed to the weld zone about, and preferably in front of and behind, the electrode having the weld particles magnetically adhered to it so that as the electrode is fed to the weld zone, the particles of weld material magnetically adhered to the electrode are fed down by the electrode through the flux into the weld zone. There, the arc melts the electrode and the weld particles submerged in the flux to form a weld of the electrode and weld particles. If desired, the fluxing material may be predeposited.

Preferably, the volume and rate of feeding the particles and the electrode to the work zone are adjustably coordinated so that varying amounts of weld particles to electrode may be provided to the weld zone to provide a weld composition of the desired ratio of weld particles to electrode.

Preferably, the feeding of the electrode, particles of magnetically-responsive weld material and fluxing materials are all started and stopped simultaneously to avoid the problem in sequential starts and stops.

The particles of weld material should be sufficiently magnetically responsive so that under normal operating conditions they will magnetically adhere to the wire electrode sufficiently to be fed down through the flux by the electrode as the electrode is fed to the weld zone. Such particles of welding materials may be partially magnetic, such as ferrochromium or fully magnetic, such as iron or nickel powder.

The electrode can be any commercial welding wire which by definition must be electrically conductive and consummable, for example such as mild steel welding wire or alloy steel welding wire.

The fluxing materials may be any of the usual and common flux materials used in submerged arc welding. Any of the commercially-available fluxing materials are satisfactory.

Referring now to the drawings, a feeder according to the present invention is illustrated which may be used in practicing the method of the invention.

The form of the apparatus illustrated in the drawings, and with reference to FIG. 1, includes a supporting housing or body 10 which is here illustrated as formed of the separate bodies 11a, 11b and 11c, which provide a plurality of compartments designated as A, B and C. Of course, if desired, a single body structure can be utilized and provided with any desired number of compartments. By releasably connecting several body members together, as later described, flexibility and ease in making adjustments, repairs and replacements are obtained.

It is noted that the three body assemblies 11a, 11b and 11c are substantially the same except that the electrode wire feeding means is incorporated in the body member 11b. Accordingly, to simplify the disclosure, unless indicated to the contrary, the components of the bodies 11a, 11b and 11c are indicated by numerals only in the specification and in the drawings, the reference letters a, b and c are added to them for the purpose of designating in which body the component is located.

Each compartment contains means generally designated as 12 for separately feeding weld material and fluxing material to the discharge nozzle 13 as subsequently described in more detail. In the embodiment illustrated in the drawings, compartments A and C comprise means for feeding fluxing material to the nozzle 13 and compartment B includes means for feeding particles of magnetizable weld material to the nozzle 13.

The body member 11b also includes a wire electrode feeding means, generally designated by the reference numeral 14, for feeding a wire electrode E to the nozzle 13 and then to the welding zone or work W as later explained in detail. Each feeding means feeds its respective material in proportion to the feeding of the wire electrode to the weld zone or the work W by means of the electrode feeding means 14. Thus, predetermined and proportional amounts of various materials utilized in the welding process and fluxing material are simultaneously fed to and deposited on, adjacent or around the weld zone or work in a one-pass operation of the feeder.

As previously mentioned, the supporting housing 10, in the form illustrated, is generally made up of three separate housings 11a, 11b and 11c each of which includes the bottom 16, and the side walls 18 and 20. At the top of each compartment A, B and C, is a hinged door 22 which closes these compartments and permits the upper portion of each of these compartments to be opened.

Disposed in the upper end of each compartment A, B and C is a hopper or container 24 into which particles of magnetic welding materials and fluxing materials are placed by opening the door 22 to that compartment. Thus, for example, in the arrangement illustrated, magnetic welding material is placed in the container 24b and fluxing material is placed in the containers 24a and 24c. As best illustrated in FIGS. 3 and 4, the hoppers or containers 24 are retained in their compartments by means of the screws 25 or by other suitable means.

Referring to FIG. 4, the lower walls 26 converge downwardly toward the opening 28 leading into the spout 30, which is in the form of a downwardly-extending substantially L-shaped tube through which the material in the hopper or container 24 moves to the area there below. A cup or collector 32 is welded or otherwise secured in the compartment under the spout 30 to collect any accumulation of the material.

As best seen in FIG. 1 a feed wheel 34 is provided for feeding the magnetic weld materials in measured and proportional amounts with respect to the electrode E from its cooperating hopper 24 into a flexible tube 36 and for feeding flux to the nonmagnetic nozzle 13.

Each of the feed wheels 34 are mounted on the axles or shafts 38 and are positioned below the respective hoppers or containers 24 and adjacent each of the corresponding spouts 30 (FIG. 4). The shafts or axles 38 are rotatably journaled by means of the antifriction assemblies generally designated by the reference numeral 40 on each of the side walls 18. While not shown, one end of each of the axles or shafts 38 are slotted and the other ends are provided with the projecting keys which interfit in the slots so that the shafts 38 rotate as a unit. Thus, each of the feed wheels 34 rotate simultaneously and the same amount.

As best seen in FIG. 4, each of the feed wheels 34 is provided with a plurality of recesses or pockets 46 formed in its periphery for feeding the magnetic welding material and fluxing material being fed by its cooperating hopper and spout as previously described. The recesses 46 are preferably inclined at an angle with respect to radius lines passing through the center of each feed wheel 34. The angle of inclination of the recesses or pockets 46 is such that when each wheel 34 rotates counterclockwise as viewed in FIG. 4, particles of magnetic welding materials and fluxing materials are picked up by the recesses 46 on the right portion of the wheel 34 and are carried over to the left portion of the wheel 34 and dumped into the flexible tube 36.

The size, depth and number of the pockets or recesses 46 are predetermined so that a predetermined quantity of material is metered to the flexible tube 36 for each revolution of the feed wheel 34. This is proportional to the amount of wire electrode fed to the work.

While not shown, each of the feed wheels 34 is removably disposed on its shaft 38. Thus, by simply placing the desired feeder wheel on the desired shaft and placing the desired material in the corresponding hopper or container 24, a predetermined and proportional quantity of particles of magnetic welding material and fluxing material are fed to the work area.

Preferably, each of the feeder tubes 36 is flexible, and is rigidly secured by the clamps 48 so that their upper ends extend up to and into the dish like members 32. Preferably, the upper ends of the tubes 36 are each provided with a slot or channel 50, as best seen in FIG. 4, and a gate 52 is pivotly secured by the pivot pin 54 for closing off the material to the tubes 36, when desired. When the gate is open, however, as illustrated in FIG. 4, the material from the feeder wheel 34 is deposited into the upper ends of the flexible tubes 36 for deposition to the work area as later described.

Preferably, the pivot pin or pivot shaft 54 extends across each of the compartments A, B and C so that all the gates 52 are opened and closed simultaneously. These shafts are interconnected in the same manner as the shafts 38 or are otherwise releasably secured together so that rotation of the pivot shaft 54 causes rotation of all of the gates 54 of the various compartments assembled together.

For the purpose of opening and closing the gates, and giving an indication thereof, a knurled knob 56 is secured to the pivot shaft 54, as best seen in FIG. 3, which is provided with the pointer 58 which points to the marks 60 and 62 on the outer portion of the body member 10 to give an indication as to whether or not the gates are in an open or closed position.

Referring again to FIG. 4, it is noted that the gate 52 shown in solid lines is in an open position, and shown in dotted lines in a closed position. In closed position it engages the lower wall of the cup or dish 32 so that any material which is picked up by the pockets 46 in the metering feed wheels 34 is returned to the cup or dish 32 when the gate 52 is closed. Thus, only predetermined metered amounts of material are deposited in the tube or conduit 36 and thus fed to the nozzle 13.

Referring now to the wire electrode feeding mechanism 14, and with particular reference to FIG. 3, this mechanism is located in the body portion, the parts of which are indicated by the reference letter b, and includes a generally cylindrical sleeve 64 which extends through the wall 22b of the compartment B through a suitable opening and is welded or otherwise suitably secured thereto as shown. The sleeve 64 was a suitable axial bore through which the wire electrode E movably extends and passes. An annular flange 66 is provided on the cylindrical sleeve 64 externally of the wall 22b, which serves as a stop member for the internally threaded coupling member 68 which threadably receives the end of the support tube or pipe 70 as illustrated. The support tube or pipe 70 in normal use is connected to a semi-automatic welding machine, or an automatic welding machine, so that the entire apparatus is supported on the welding apparatus (not shown). The support tube or pipe 70, and in such event coupling member 68, may be omitted and not employed for supporting the feeder, and any other type of support may be used such as a handle which is grasped by the operator, or the apparatus may be supported by overhead suspension means, such as a cable and the like, not shown.

The internal end of the guide sleeve 64 is provided with a recess or counterbore 72 into which is secured by welding or other means a curved guide tube 74. The tube 74 generally curves about 90°. The lower end thereof extends through the lower plate member 16b and is rigidly secured into the counterbored portion or enlarged passage 114 of the discharge nozzle 13.

The tube 74 serves to guide the wire electrode E and change its direction of movement from a generally horizontal one to a generally vertical one as it is fed to the nozzle 13 and then to the work W or weld zone to be welded or weld coated. The guide tube 74 has a plurality of openings 76 adjacent its upper portion which are formed there through at intervals which receive the guide and bending wheels 78. Such wheels or rollers 78 may be mounted in any suitable way, but preferably are mounted on the axles 80 which are threaded or otherwise suitably connected to the vertical frame member 20b.

In addition to the series of openings 76, the guide tube 74 has an enlarged opening 82 for receiving a contact drive wheel or roller which contacts the upper portion of the wire electrode E. An additional opening 86 is provided below the opening 82 which receives an adjustable contact wheel or roller 88 which engages the wire electrode E directly below the driving contact wheel 84 so that the wire electrode E is maintained in firm engagement with the driving wheel 84 so that rotation of the driving wheel in turn causes a corresponding movement of the wire electrode E.

The contract wheel or roller 88 preferably is adjustably mounted. To this end, it is mounted on a yoke 90 which is formed integrally with or otherwise suitably secured to the upper end of the shaft 92 which is mounted in engagement with but separate from a lower threaded adjusting rod 94 threadedly received in the nut or sleeve 96 welded or otherwise rigidly secured to the bottom member 18b. Thus, by rotation of the knurled knob 98 the upper end of the threaded shaft 94 is moved upwardly and downwardly, which in turn moves the shaft 92 and the contact wheel 88 thereby adjusting the space between the driving roller 84 and the contact roller wheel 88. The upper shaft 92 is non-rotatably mounted through the nut 96 so that the contact wheel 88 remains in the position illustrated as it is moved upwardly and downwardly by movement of the threaded rod 94. A lock nut 100 is provided on the threaded shaft 94 for locking the shaft 94 and therefore the contact roller 88 in the desired position.

The electric current for the wire electrode E is supplied through an electrical conductor 102 which is connected to the housing member 22b by any suitable means such as the clamp 104. The electrical circuit to the wire electrode E is completed by another electrical conductor 106 which is secured to the work W which is being welded. For the convenience of disclosure, details of the electric circuit to the wire electrode E from the conductor 102 have been omitted. Both of the conductors 102 and 106 extend to the welding machine (not shown) which provides for the automatic or semi-automatic welding.

Figure 2:
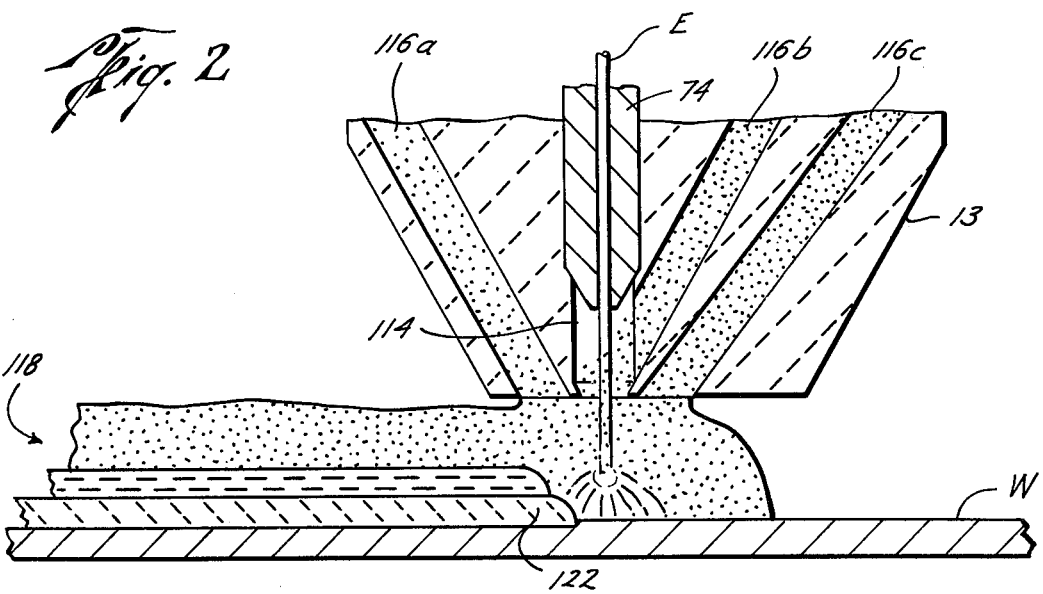
FIG. 2 is a fragmentary, enlarged elevational view, in section, of the discharge nozzle of the apparatus of FIG. 1.

Referring now to the discharge nozzle 13, as best seen in FIGS. 1 and 2, the nozzle 13 is formed of a nonconductive or non-metallic material. These include materials consisting of mica, porcelain, glass, quartz and similar inorganic materials or combinations of materials such as silicone elastomer, mica, glass fiber, asbestos, and the like, with suitable bonding substances such as appropriate silicone resins or any insulating material of which the conductivity is, in practice, very small in order to avoid the creation of a magnetic field in the nozzle, other than the magnetic field of the electrode passing through the nozzle. Accordingly, the term "formed of a non-conductive material" as used herein includes all materials, which under the conditions of use will not have a magnetic field created around them or in the vicinity of them sufficient to cause clogging or jamming of the nozzle by magnetic particles due to the magnetic field created by the electric current in the electrode E while in the nozzle 13.

The nozzle 13 in the form illustrated is of a generally truncated cone configuration, and includes a central passage 114 into which the electrode guide 74 extends. A passage 116b is provided which communicates with the flexible tube 36b through which the magnetic weld particles are fed from the hopper or container 24b. In addition, a pair of additional passageways, 116a and 116c are provided which communicate with the flexible tubes 36a and 36c, respectively, for providing of particles of fluxing material from the containers or hoppers 24a and 24c, respectively, about, and preferably in front and behind, the electrode E with the weld particles 116 magnetically adhering to it as it leaves the nozzle 13. Thus, metered amounts of magnetic weld particles are fed from the container 24b to the electrode E in the passage 14 in the nozzle 13 where these particles magnetically adhere to the electrode E. Simultaneously, fluxing particles from the containers 24a and 24c are fed by the feeding mechanisms into the flexible tubes 36a and 36c to the passages 116a and 116c, respectively, about the electrode E with the magnetic particles adhering to it into the weld zone and onto the work W where the magnetical particles and electrode are melted while submerged in the fluxing material to form the resulting bulkweld.

The feeder may include as many compartments as desired, and these may be releasably secured together or formed as a single unit.

In operation of this feeder, the desired magnetic welding particles are placed in the container 24b and fluxing materials are placed in the containers 24a and 24c, which are determined in advance. In addition, the desired electrode E is placed into the feeder as illustrated. The current and travel are then turned on, with the gates 52 open, and the feed wheels 36 meter predetermined amounts of the magnetic welding particles and fluxing material to the nozzle 112, the fluxing materials being deposited in the weld zone on the work W and the magnetic weld particles being fed to the electrode E in the passage 114 where they magnetically adhere to the electrode E and are fed down with the electrode E through the flux to the weld zone and the work W. Thus, as the wire electrode E is fed to the work W at a predetermined rate, this drives the driving weld 84 which in turn drives the metering material feeding wheels 34a, b and c which causes a corresponding, simultaneous and proportioned amount of magnetic weld material and fluxing material to be fed to the electrode E and to the weld zone and work. Thus, a predetermined and proportionate amount of weld material and electrode are deposited, along with fluxing material, to the weld zone which forms the composition of the final bulkweld or overlay in closely controlled proportions or analysis. As previously mentioned, the feed wheels may be of different size, may have different size and numbers of pockets 46 for feeding different proportionate amounts of material to the work with respect to the electrode E so as to obtain a predetermined final analysis of the weld or overlay 118.

The above-described apparatus is in a number of respects similar to the feeder for welds described in my U.S. Pat. No. 3,172,991 to which reference is made for further mechanical details. If desired, however, an apparatus such as disclosed in my U.S. Pat. No. 3,060,307 may be conformed to and provided with a nozzle formed of electrically non-conductive material in which magnetically-responsive weld particles are fed to the consumable electrode. Also, the fluxing material container and feed to the weld zone can be separate from the feeder, if so desired. When using a single container, either combined with or separate from, the feeder, and it is desired to deposit the fluxing material in more than one place in the weld zone, for example in front of and behind the electrode (although the fluxing material may be deposited in one place about or ahead of the electrode), a Y-type or other suitable connection can be used.

Any of the types of semi-automatic and automatic welding equipment can control the rate of feeding of the wire electrode E, provide the electrical current in the wire electrode E, and travel of the apparatus.

The apparatus illustrated in the drawings and described and can be used in practicing the method of the invention by which magnetically-responsive weld particles are magnetically adhered to the electrode and are fed down through the fluxing material by the electrode as it is fed to the work in the weld zone.

The present invention, therefore, is well suited and adapted to attain the object and ends and has the advantages and different features mentioned as well as others inherent therein.

While presently preferred embodiments of the invention have been given for the purposes of disclosure, changes may be made which are within the spirit of the invention as defined by the scope appended claimed.

What is claimed is:

1. A method of welding at a weld zone comprising,
   causing an electrical current to flow in a consummable electrically conductive electrode thereby providing a magnetic field about the electrode,
   feeding particles of magnetically-responsive weld material to the electrode thereby magnetically adhering the particles of weld material to the electrode,
   feeding fluxing material to the weld zone, and
   feeding the electrode with the particles of weld material magnetically adhered to it through a discharge nozzle formed of an electrically non-conductive material to the weld zone through the fluxing material thereby feeding the particles of weld material through the fluxing material into the weld zone.

2. The method of claim 1 including,
   coordinating the rate of feeding of the particles of magnetically-responsive weld material and the electrode whereby metered proportionate amounts thereof are fed to the work zone.

3. The method of claim 1 where,
   the feeding of the fluxing material to the weld zone is about the electrode with the weld particles magnetically adhered to it.

4. The method of claim 1 including,
   coordinating the rate of feeding of the particles of magnetically-responsive weld material and the electrode whereby metered proportionate amounts thereof are fed to the work zone, and
   where the feeding of the fluxing material to the weld zone is behind and ahead of the electrode with the weld particles magnetically adhered to it.

5. A feeder for use in welding in a weld zone including,
   a discharge nozzle formed of an electrically non-conductive material,
   means for feeding an electrically conductive consummable electrode through the nozzle to the weld zone,
   means for feeding particles of magnetically-responsive weld material to the electrode,
   means for feeding fluxing material to the weld zone, and
   means for causing an electric current to flow in the electrode thereby providing a magnetic field about the electrode,
   whereby the particles of magnetically-responsive weld materials fed to the electrode magnetically adhere to it and are pulled down by it through the fluxing material to the weld zone as the electrode is fed to the weld zone.

6. The feeder of claim 5 including,
   means coordinating the rate of feeding of the electrically conductive consummable electrode and the particles of magnetically-responsive weld materials whereby metered proportionate amounts of the electrode and the weld particles are fed to the work zone.

7. A feeder for use in welding in a weld zone comprising, a body,
   a fluxing material container carried by the body,
   a container for magnetically-responsive weld particles carried by the body,
   a discharge nozzle formed of an electrically non-conductive material,
   means for feeding an electrically conductive consummable electrode through the nozzle to the weld zone,
   passage means communicating with the container for magnetizable weld particles and with the last-mentioned means arranged to feed the magnetically-responsive weld particles to the electrode when in the nozzle,
   passage means communicating with the fluxing material container and extending through the nozzle for feeding fluxing material from the fluxing material container to the work zone, and
   means for causing an electric current to flow in the electrode thereby providing a magnetic field about the electrode,
   whereby the particles of magnetically-responsive weld material fed to the electrode magnetically adhere to it and are fed by it through the fluxing material to the weld zone.

8. The feeder of claim 7, including,
   means coordinating the rate of feeding of the electrically conductive consummable electrode and the magnetically-responsive weld particles to the electrode whereby metered proportionate amounts of the electrode and the particles of weld material are simultaneously fed to the weld zone.

9. The feeder of claim 7, where
   the passage means from the weld material container communicates with the electrode passage means in the nozzle, and
   the fluxing material passage means is arranged to feed the fluxing material to the work zone about the electrode with the magnetically-responsive weld particles magnetically adhered to it.

10. The feeder of claim 7, where,
    the passage means in the nozzle for feeding fluxing material to the weld zone are arranged to feed the fluxing material ahead of and behind the electrode in its direction of travel.

11. In a feeder for use in a weld zone submerged in fluxing material, a discharge nozzle formed of an electrically non-conductive material, means for feeding an electrically conductive consummable electrode through the nozzle to a weld zone, means for feeding particles of magnetically-responsive weld material to the electrode, and means for causing an electric current to flow in the electrode thereby providing a magnetic field about the electrode and sufficient to magnetically adhere the particles of magnetically-responsive weld material to the electrode, whereby the particles of magnetically-responsive weld particles are pulled down through the fluxing material to the weld zone by the electrode.

* * * * *